Patented Oct. 8, 1940

2,217,613

UNITED STATES PATENT OFFICE 2,217,613

TERPENE-CYANOACYL COMPOUND AND METHOD OF PRODUCING SAME

Joseph N. Borglin, Wilmington, Del., assignor to Hercules Powder Company, Wilmington, Del., a corporation of Delaware No Drawing. Application December 27, 1939, Serial No. 311,167

19 Claims. (Cl. 260—454)

This invention relates to terpene thiocyanoacyl esters. More particularly it relates to such esters in which the ester linkage is upon a tertiary carbon of the terpene. It also relates to a method for the production of such esters.

By the method in accordance with this invention, I react a terpene compound having an oxygen linkage upon a tertiary carbon atom of the terpene with a suitable halogen substituted acylating agent and then with a metal thiocyanate, a metal selenocyanate, or a metal tellurocyanate which is reactive under the conditions employed. For example, I may react terpineol with a suitable acylating agent such as a halogen substituted carboxylic acid anhydride, a halogen substituted acyl halide, or a halogen substituted carboxylic acid and then with a metal thiocyanate, selenocyanate, or tellurocyanate. Or in accordance with this invention, I may, for example, react cineole with a suitable acylating agent chosen from the group consisting of halogen substituted carboxylic acid anhydrides and halogen substituted acyl halides, and then with a metal thiocyanate, selenocyanate, or tellurocyanate. In each case, a terpinyl thiocyanoacyl ester will be produced.

Again I may react terpin or terpin hydrate with a halogen substituted carboxylic acid or acid anhydride or a halogen substituted acyl halide and then with a metal thiocyanate, selenocyanate, or tellurocyanate. A mono- or a diester will be obtained; in each case, the thiocyanoacyl, selenocyanoacyl, or tellurocyanoacyl ester linkage will be upon a tertiary carbon of the terpene. Other terpene compounds having an oxygen linkage upon a tertiary carbon atom may be reacted in accordance with this invention, for example, dihydroterpineol, the terpinenols, dihydroterpinyl acetate, dihydroterpinyl propionate, terpinyl acetate, terpinyl propionate or other tertiary esters of an acid weaker than the particular acylating agent to be used in making an ester according to this invention. It is not essential that the compounds reacted upon be in pure form. They may be diluted with saturated terpenes, petroleum hydrocarbons, other terpenes, etc. Commercial terpene cuts rich in one or more reactants, for example, pin oil, may be used. Mixtures of reactants mentioned may also be used.

Suitable halogen substituted carboxylic acid anhydrides which I may utilize are such as, for example, monochloroacetic anhydride, dichloroacetic anhydride, trichloroacetic anhydride, alpha-chloropropionic anhydride, beta-chloropropionic anhydride, dichloropropionic anhydride, alpha, beta, or gamma-chlorobutyric anhydride, dichlorobutyric anhydride, chlorobenzoic anhydride, chloromalonic anhydride, chlorophthalic anhydride, chlorolauric anhydride, chlororicinoleic anhydride, chlorostearic anhydride, chlorocaproic anhydride, etc. or similar corresponding bromine, iodine, and fluorine substituted acid anhydrides. Suitable halogen substituted acyl halides which I may use are such as, for example, monochloroacetyl chloride, dichloroacetyl chloride, trichloroacetyl chloride, alpha-chloropropionyl chloride, beta-chloropropionyl chloride, dichloropropionyl chloride, alpha, beta, or gamma-chlorobutyryl chloride, dichlorobutyryl chloride, chlorocaproyl chloride, chlorobenzoyl chloride, chlorostearyl chloride, chlororicinoleyl chloride, chlorolauryl chloride, chloromalonyl chloride, chlorophthalyl chloride, etc. Alternatively, any such acyl halide in which the chlorine substituent is replaced by bromine, iodine, or fluorine instead of the chlorine, or in which the acyl halide chlorine atom or both substituent and acyl halide chlorine atoms are replaced by other halogen atoms may be used. Where it is desired to utilize a halogen substituted carboxylic acid, an acid such as any of the acids corresponding to the halogen substituted acid anhydrides hereinbefore mentioned may, for example, be used. Mixtures of acylating agents may be used, if desired.

The metal thiocyanate which I use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium, thiocyanate, etc. When it is desired to make a selenocyanoacylate, the metal selenocyanate I may use, may be, for example, sodium selenocyanate, potassium selenocyanate, lithium selenocyanate, ammonium selenocyanate, calcium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene compound having an oxygen linkage upon a tertiary carbon atom will first be reacted with the halogen substituted acylating agent chosen for the reaction. The resulting tertiary terpene ester will then be isolated from any by-products of the reaction and preferably any unreacted acidic material will be removed. The second stage consists in treating this ester with a metal thiocyanate, selenocyanate, or tellurocyanate as the case may be and recovering the product from the reaction mixture. Preferably all unreacted thiocyanate, selenocyanate, or tellurocyanate is removed from the product, for example, by washing with water. I prefer to carry out the second stage in the presence of a suitable inert solvent such as methanol, ethanol, propanol, isopropanol, butanol, acetone, ethyl acetate, etc. Each of these stages of my process may be carried out at a temperature within the range between about 0° C. and about 200° C. but preferably at a temperature within the range between about 30° C. and about 150° C.

The ester produced by this method has the type formula ROOCR'XCN in which R is a radical of a terpene tertiary alcohol, i. e. in which the acyl group represented by the OOCR'XCN is upon a tertiary carbon, R' is an aliphatic or aromatic radical and X is a member of the group consisting of sulfur, selenium, and tellurium. The product may be, for example, a thiocyanoacyl ester in which the halogen substituent of the acylating agent used in the first stage has been replaced by an SCN group. Two acyl groups may be introduced where the terpene compound utilized contains two reactive positions, as, for example, in the case of terpin or terpin hydrate.

The halogen substituted acylates of the first stage reaction are light in color if the reaction is carried out in the absence of oxygen, for example, under a blanket of $CO_2$. Substantially water white esters may be obtained by vacuum distillation. The color of the thiocyanoacylate products follows the color of the first stage ester from which they are prepared. Where very light colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which follow. In the examples, all parts and percentages are by weight unless otherwise specified.

*Example 1*

A mixture of 51 parts of cineole and 38 parts of chloroacetyl chloride was heated under reflux in an oil bath at a temperature of 120° C. After ½–¾ hours, vigorous reaction took place with escape of fumes from the reflux condenser. The reaction mixture was cooled down to room temperature, then again heated for about 4 hours at about 90° C. Water was then added and the terpinyl chloroacetate obtained was extracted with about 35 parts of petroleum ether. The petroleum ether fraction was washed free of acid with water after which the petroleum ether was evaporated under reduced pressure. This procedure gave a yield of 57.5 parts of terpinyl chloroacetate product analyzing 43% chloride.

45 parts of the terpinyl chloroacetate, 20 parts of sodium thiocyanate, and 40 parts of ethyl alcohol were mixed and refluxed for about 4½ hours. 35 parts of petroleum ether was then added and the resulting mixture was washed several times with water to remove alcohol and inorganic salts. Upon evaporation of petroleum ether under reduced pressure, a yield of 35 parts of liquid product, analyzing 5.7% sulfur and 1.3% chlorine, containing the terpinyl thiocyanoacetate was obtained.

*Example 2*

A mixture of 25 parts of cineole and 30 parts of chloroacetic anhydride was heated for 6 hours at a temperature of 135–145° C. The reaction product was recovered by adding 21 parts of petroleum ether, washing free of acid with water, and evaporating the petroleum ether under reduced pressure. A yield of 21.5 parts of terpinyl chloroacetate product was obtained.

18 parts of the terpinyl chloroacetate product, 1 part of sodium thiocyanate, and 20 parts of ethyl alcohol were refluxed for about 6 hours. The terpinyl thiocyanoacetate product was recovered the same way as described for Example 1, using about 20 parts of petroleum ether. A yield of 16 parts of product containing the terpinyl thiocyanoacetate was obtained.

*Example 3*

A mixture of 25 parts of cineole and 35 parts of alpha-bromo-propionyl bromide was heated at 120° C. for about 10 minutes. At this temperature a very vigorous reaction took place with a strong evolution of a gas. The reaction mixture was cooled to room temperature and then heated on a steam bath for about 2 hours. The reaction mixture was then extracted with about 40 parts of petroleum ether. The extract was washed free of acid with water and the petroleum ether was then removed by heating under reduced pressure. 30 parts of terpinyl bromopropionate analyzing 34.5% bromine were obtained.

23.5 parts of the bromo ester, 10.5 parts of sodium thiocyanate, and 32 parts of 95% ethyl alcohol were refluxed for 9.5 hours over a heating bath at a temperature of 105–115° C. About 24 parts of petroleum ether was then added and the resulting mixture was then treated in the same manner as in Example 1 to recover the resulting ester. A yield of 17 parts of product, analyzing 4.2% sulfur, containing the terpinyl thiocyanopropionate, was obtained.

*Example 4*

A mixture of 25 parts of cineole and 20.5 parts of chloropropionyl chloride was refluxed for 11 hours in an oil bath at 105–115° C. About 16 parts of petroleum ether was then added to the reaction mixture and the resulting solution was washed free of acid with water. The petroleum ether was then removed by heating under reduced pressure. A yield of 24 parts of terpinyl chloropropionate analyzing 19.5% chlorine was obtained.

19 parts of the chloropropionate ester, 6.5 parts of sodium thiocyanate, and 32 parts of 95% ethyl alcohol were refluxed for 6 hours in an oil bath at 100–110° C. 24 parts of petroleum ether were added and the mixture was washed with water until free of sodium thiocyanate. The solvents were then removed by evaporation at reduced pressure. A yield of 16.5 parts of product, analyzing 7.2% sulfur, containing the terpinyl thiocyanopropionate was obtained.

*Example 5*

A mixture of 30.8 parts of alpha-terpineol and 34.2 parts of monochloracetic anhydride was heated under a carbon dioxide blanket for 30 hours at 95° C. and for 10 additional hours at 110°

C. The reaction mixture was then dissolved in about 100 parts of a heptane-benzene mixture and the resulting solution was washed with water. The solvents were removed by distillation at reduced pressure to give a yield of 24 parts of terpinyl chloracetate.

22 parts of this product were dissolved in 40 parts of 95% ethanol and after adding 18 parts of sodium thiocyanate, the mixture was refluxed for one hour. The resulting mixture was then diluted with 70 parts of commercial heptane and the whole washed with water. After distillation at reduced pressure to remove the volatile solvents, a yield of 21.6 parts of product containing the terpinyl thiocyanoacetate was obtained.

*Example 6*

A mixture of 30.8 parts of alpha-terpineol and 50.1 parts of alpha-bromobutyric acid was heated under a blanket of carbon dioxide for 18 hours at 95–105° C. and for 30 hours at 120° C. The reaction mixture was then dissolved in 70 parts of commercial heptane and the solution washed with water. The heptane was then removed by distillation at reduced pressure. A yield of 54.1 parts of terpinyl bromobutyrate analyzing 31.8% bromine was recovered.

52.3 parts of this product were dissolved in 80 parts of 95% ethyl alcohol. 25 parts of sodium thiocyanate were added and the mixture was refluxed for an hour. 70 parts by weight of commercial heptane were then added and the resulting solution was washed with water. Volatile solvents were then removed by distillation at reduced pressure. A yield of 24.2 parts of product, having a sulfur content of 5.9%, containing the terpinyl thiocyanobutyrate, was obtained.

*Example 7*

A mixture of 30.8 parts of alpha-terpineol and 25.6 parts of beta-chloropropionyl chloride was heated for 16 hours under a blanket of carbon dioxide at 112–117° C. 70 parts of commercial heptane were then added and the solution washed with water. The heptane was then distilled off at reduced pressure. A residue of 28.1 parts by weight containing the terpinyl chloropropionic ester was obtained.

26 parts of this product were dissolved in 40 parts of 95% ethyl alcohol and 20 parts of sodium thiocyanate were added. The mixture was refluxed for 1 hour. The product was then recovered as in Example 6. A yield of 23.6 parts of the product containing the terpinyl thiocyanopropionate was obtained.

*Example 8*

A mixture of 25 parts of hydrogenated terpineol and 20.5 parts of beta-chloropropionyl chloride was heated under reflux in a bath at a temperature of 115–125° C. for 7.5 hours. 24 parts of petroleum ether was then added and the resulting solution was washed free of acid with water. The solvent was removed by heating under reduced pressure. A yield of 25.5 parts of hydroterpinyl chloropropionate which analyzed 16.2% chlorine was obtained.

21 parts of this ester, 8 parts of sodium thiocyanate, and 32 parts of 95% ethyl alcohol were mixed and heated under reflux for 6 hours in an oil bath at 115–125° C. After adding about 28 parts of petroleum ether to the reaction mixture, it was washed free of sodium thiocyanate with water. Volatile solvents were then removed by distillation at reduced pressure. A yield of 18 parts of product, which analyzed 7.0% sulfur, containing the hydroterpinyl thiocyanopropionate, was obtained.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The method in accordance with this invention has the advantage that relatively pure tertiary terpene derivatives, i. e., esters with the carboxyl linkage substantially entirely on tertiary carbon atoms, may be prepared. Thus, for example, terpinyl derivatives of relatively high purity may be prepared from cineole, terpineol, terpin, etc. by the method of this invention. It is possible to prepare terpinyl derivatives, for example, from certain of the terpene hydrocarbons, but in such preparation, rearrangement of the terpene causes the terpinyl derivatives to be formed either in minor quantities or admixed with considerable quantities of other esters.

The new compounds in accordance with this invention are useful in insecticides. For example, they may be used in 0.5% to 20% solutions in kerosene, with or without other toxic agents such as pyrethrum, rotenone, etc. for fly sprays and the like, or in emulsions, or on solid carriers, etc. They may also be used in the flotation of minerals and they may be used in the preparation of wetting agents by treatment with oxidizing agents such as nitric acid. Many of the compounds possess wetting power without modification.

The term "aromatic" as used herein includes any radical containing a benzene linkage in its structure. The terms "terpineol" and "terpinyl" include the alpha-, beta-, and gamma- modifications. The term "cineole" includes both the 1:8 and the 1:4 modifications. Similarly, the word "terpin" includes both the 1:8 and 1:4 modifications.

This application is a continuation-in-part of my previous application, Serial No. 198,687, filed March 29, 1938, entitled "Terpene-cyanoacyl compounds and method of producing same."

It will be understood that the details and examples hereinbefore mentioned are illustrative only, and the invention as broadly described and claimed is in no way limited thereby.

What I claim and desire to protect by Letters Patent is:

1. A method for the preparation of terpene thiocyanoacylates, selenocyanoacylates, and tellurocyanoacylates which comprises reacting a terpene compound having an oxygen linkage upon a tertiary carbon atom of the terpene with a suitable halogen substituted acylating agent and then with a compound from the group consisting of metal thiocyanates, metal selenocyanates, and metal tellurocyanates at least partially soluble in the reaction mixture.

2. A method for the preparation of terpene thiocyanoacylates, selenocyanoacylates, and tellurocyanoacylates which comprises reacting cineole with a compound chosen from the group consisting of halogen substituted carboxylic acid anhydrides and halogen substituted acyl halides, and then with a compound from the group consisting of metal thiocyanates, metal selenocyanates, and metal tellurocyanates at least partially soluble in the reaction mixture.

3. A method for the preparation of terpene thiocyanoacylates, which comprises reacting cineole with a halogen substituted acyl halide and then with a metal thiocyanate at least partially soluble in the reaction mixture.

4. A method for the preparation of terpene thiocyanoacylates, which comprises reacting cineole with a halogen substituted carboxylic acid anhydride and then with a metal thiocyanate at least partially soluble in the reaction mixture.

5. A method for the preparation of terpene thiocyanoacylates, which comprises reacting cineole with a halogen substituted acetyl halide and then with a metal thiocyanate at least partially soluble in the reaction mixture.

6. A method for the preparation of terpene thiocyanoacylates, which comprises reacting cineole with a halogen substituted propionyl halide and then with a metal thiocyanate at least partially soluble in the reaction mixture.

7. A method for the preparation of terpene thiocyanoacylates, which comprises reacting cineole with a halogen substituted butyryl halide and then with a metal thiocyanate at least partially soluble in the reaction mixture.

8. A method for the preparation of terpene thiocyanoacylates, which comprises reacting cineole with chloroacetyl chloride and then with an alkali metal thiocyanate.

9. A method for the preparation of terpene thiocyanoacylates, which comprises reacting cineole with a halogen substituted lower aliphatic acyl bromide and then with an alkali metal thiocyanate.

10. A method for the preparation of terpene thiocyanoacylates, which comprises reacting cineole with a halogen substituted lower aliphatic acyl chloride and then with an alkali metal thiocyanate.

11. A method for the preparation of terpene thiocyanoacylates, which comprises reacting cineole with bromopropionyl bromide and then with an alkali metal thiocyanate.

12. A method for the preparation of terpene thiocyanoacylates, selenocyanoacylates, and tellurocyanoacylates which comprises reacting terpineol with a suitable halogen substituted acylating agent and then with a compound from the group consisting of metal thiocyanates, metal selenocyanates, and metal tellurocyanates at least partially soluble in the reaction mixture.

13. A method for the preparation of terpene thiocyanoacylates, which comprises reacting terpineol with a halogen substituted lower aliphatic acylating agent and then with an alkali metal thiocyanate.

14. A new terpene compound having the type formula ROOCR'XCN in which R is a radical of a terpene tertiary alcohol, R' is a radical selected from the group consisting of aliphatic and aromatic radicals, and X is a member of the group consisting of sulfur, selenium, and tellurium.

15. A thiocyanoacylate of a terpene tertiary alcohol.

16. A terpinyl thiocyanoacylate.

17. A terpinyl thiocyanoacetate.

18. A terpinyl thiocyanopropionate.

19. A terpinyl thiocyanobutyrate.

JOSEPH N. BORGLIN.